(12) United States Patent
Mack et al.

(10) Patent No.: US 9,013,140 B2
(45) Date of Patent: Apr. 21, 2015

(54) ELECTRICALLY CHARGEABLE ENERGY STORE DEVICE AND METHOD OF CHARGING

(75) Inventors: Juergen Mack, Goeppingen (DE); Holger Claus, Stuttgart (GB)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 13/416,314

(22) Filed: Mar. 9, 2012

(65) Prior Publication Data

US 2012/0229078 A1    Sep. 13, 2012

(30) Foreign Application Priority Data

Mar. 11, 2011 (DE) .................... 10 2011 005 411

(51) Int. Cl.
| | |
|---|---|
| H01M 10/44 | (2006.01) |
| H01M 10/46 | (2006.01) |
| H01M 10/48 | (2006.01) |
| H01M 10/42 | (2006.01) |
| H02J 7/00 | (2006.01) |

(52) U.S. Cl.
CPC .......... *H01M 10/482* (2013.01); *H01M 10/425* (2013.01); *H01M 10/441* (2013.01); *H01M 10/443* (2013.01); H01M 2010/4271 (2013.01); *H02J 7/0022* (2013.01); *H02J 7/0081* (2013.01); *H02J 7/0091* (2013.01)

(58) Field of Classification Search
USPC ......... 320/107, 114, 116, 118, 119, 150, 152, 320/162
See application file for complete search history.

(56) References Cited

U.S. PATENT DOCUMENTS

| | | | |
|---|---|---|---|
| 2008/0303485 A1* | 12/2008 | Ng ............................... | 320/139 |
| 2011/0012558 A1 | 1/2011 | Schaffnit | |
| 2011/0156648 A1 | 6/2011 | Goff et al. | |
| 2011/0298425 A1* | 12/2011 | Liu et al. ....................... | 320/118 |
| 2012/0105005 A1* | 5/2012 | Lupienski et al. ............ | 320/116 |

FOREIGN PATENT DOCUMENTS

| | | |
|---|---|---|
| EP | 2 068 420 | 6/2009 |
| WO | WO 2009/121014 | 10/2009 |
| WO | WO 2010/143670 | 12/2010 |

\* cited by examiner

*Primary Examiner* — Edward Tso
(74) *Attorney, Agent, or Firm* — Kenyon & Kenyon LLP

(57) ABSTRACT

An electrically chargeable energy store includes a plurality of energy cells connected in series, a scanning device for the cell voltages of the energy cells, and a processing device for determining a setpoint charging current through the energy cells based on the scanned cell voltages. The processing device is equipped to determine the setpoint charging current as a function of differences between the scanned cell voltages. A method for charging an electrically chargeable energy store includes steps of scanning of the cell voltages of the energy cells, determining a setpoint charging current through the energy cells based on the differences of the scanned cell voltages, and limiting of a charging current flowing through the energy cells to the determined setpoint charging current.

18 Claims, 3 Drawing Sheets

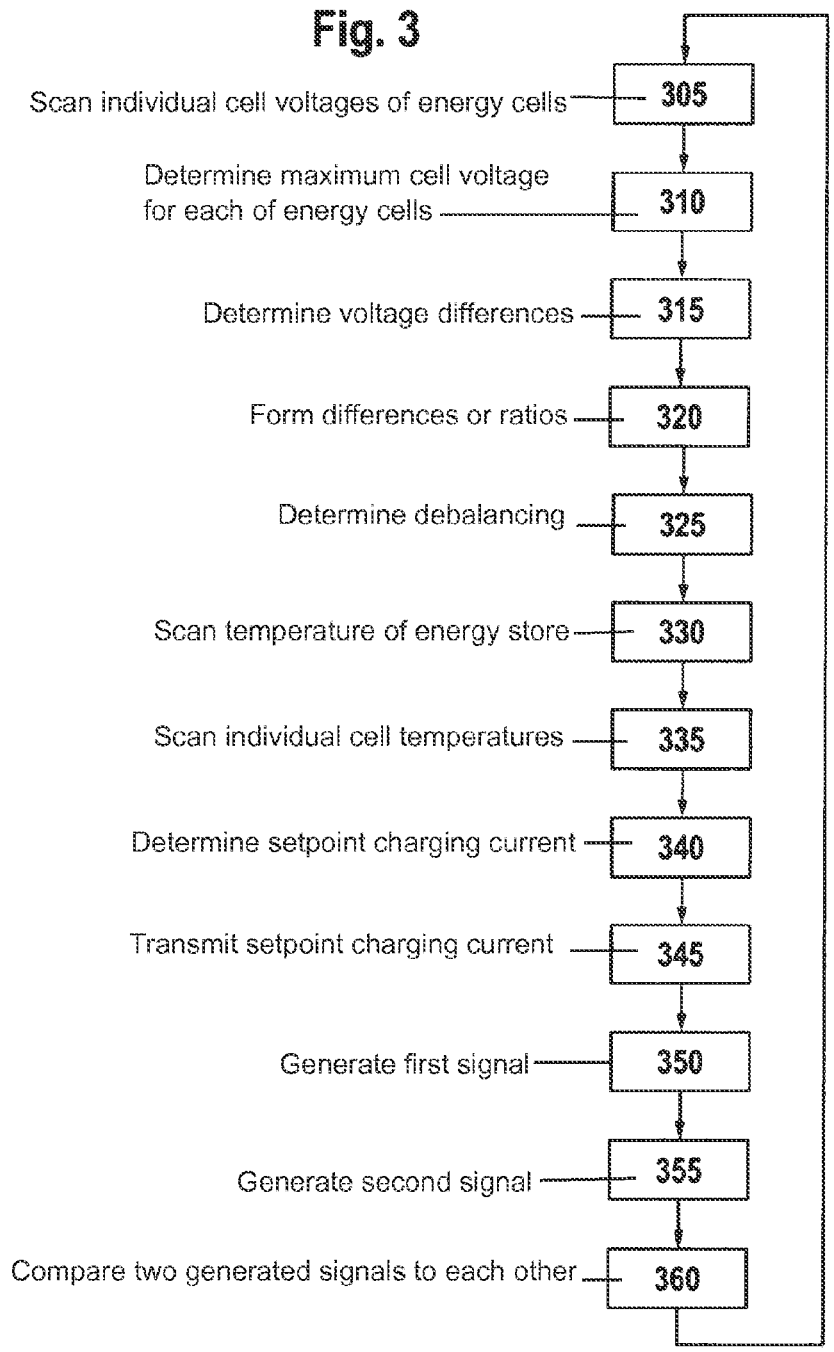

ELECTRICALLY CHARGEABLE ENERGY STORE DEVICE AND METHOD OF CHARGING

BACKGROUND OF THE INVENTION

1. Field of the Invention

The present invention relates to an energy store and a charging method.

2. Description of Related Art

An electric battery includes a number of electric energy cells which are connected to one another in series. To charge the battery, a predetermined charging current is led through the energy cells. During the course of the charging process, the cell voltages of the energy cells in each case approach a predetermined maximum cell voltage. Some batteries may react sensitively to a charging error, such as overcharging. Lithium ion batteries may burst, for example, which may be accompanied by an explosion or a fire.

In order to avoid a charging error and to end the charging process in time, it is customary to switch off the charging current when one of the energy cells has reached the maximum cell voltage assigned to it. In this context, however, the state of charge of other cells, whose cell voltages are below the respectively specified maximum cell voltages, may not yet have reached a maximum state of charge, so that on an overall basis, the battery is only partially charged.

BRIEF SUMMARY OF THE INVENTION

An object of the present invention is to charge the battery as completely as possible.

An electrically chargeable energy store according to the present invention includes a plurality of energy cells connected in series, a scanning device for the cell voltages of the energy cells, and a processing device for determining a setpoint charging current through the energy cells based on the scanned cell voltages. The processing device, in this instance, is equipped to determine the setpoint charging current as a function of differences between the scanned cell voltages.

Based on the differences between the scanned cell voltages, a debalancing of the energy cells is able to be determined. Based on the debalancing, the setpoint charging current may be determined in such a way that an energy cell having a high cell voltage is not overcharged, while another energy cell having a lower cell voltage continues to be charged. Because of that, the debalancing of the energy cells may be minimized, so that the energy store in total is able to be charged more highly. The energy able to be obtained from the energy store is able to be maximized thereby.

In one preferred specific embodiment, the processing device is equipped to determine the setpoint charging current in at least three different steps or without steps. Thereby, an exact adaptation of the setpoint charging current to the debalancing may take place, so that the energy cells are able to be fully charged as independently as possible of their individual load-carrying capability.

The processing device may be equipped additionally to determine the charging current based on the maximum cell voltages assigned to the energy cells. A maximum cell voltage for all the energy cells may be used, or an individual maximum cell voltage may be assigned to each energy cell. By the observation of the difference between the maximum cell voltage and the actual cell voltage, the setpoint charging current may be determined in an improved manner, particularly in a last section of the charging process of the energy store, in such a way that the degree of charging of the energy store is maximized.

An additional scanning device for scanning the temperature of the energy store may be provided, the processing device being equipped for determining the charging current additionally based on the scanned temperature.

As the charging state increases, that is, as the charging of the energy store progresses, the temperature of the energy store may be used as a further indication for a remaining absorption capability of the energy store. By taking into account the temperature of the energy store, one is able to avoid a charging error that may occur in response to the exceeding of the temperature of the energy store above a predetermined place value. For this reason, the energy store may be charged in a more sparing manner and safety during the charging process may be increased.

In one variant, the additional scanning device is able to scan cell temperatures of the energy cells, and the processing device is able to be equipped for determining the charging current additionally based on the cell temperatures.

The individual cell temperatures may be put in relation to the cell voltages or the differences between the cell voltages and the respective maximum cell voltages, so that the setpoint charging current may continue to be determined in an improved manner in the sense of an as complete as possible charging of the energy store.

A charging device for providing a charging current for the energy store described includes a limiting device for limiting the charging current provided to the energy store to the setpoint charging current determined by the processing device.

In a first specific embodiment, the limiting device is enclosed in the energy store. In a second specific embodiment, the limiting device is enclosed by a charging device or an adapter that connects the charging device to the energy store. The integration of the limiting device may take place depending on the application. A system which includes the power source, the charging device described and the energy source described may consequently be designed in a cost-effective manner.

The charging device may include a first device for providing a first signal as a function of the charging current, a second device for providing a second signal as a function of the setpoint charging current and a comparing device for controlling the charging current as a function of the two signals. In that way, the charging current may be limitable to the setpoint charging current in a simple and reliable manner.

In one preferred specific embodiment, the signals are represented by voltages, and the second device includes a square-wave generator and a post-connected low-pass filter. Thereby, the second signal is easily produced, particularly by a digital processing device. The determination and processing of the setpoint charging current may consequently be carried out in a cost-saving manner and highly integrated essentially in a digital manner, while an analog activation of the limiting device may be implemented using simple means.

A method according to the present invention for charging an electrically chargeable energy store, having a plurality of energy cells connected in series, includes steps of scanning of the cell voltages of the energy cells, of determining a setpoint charging current through the energy cells, based on the differences of the scanned cell voltages and of the limiting of a charging current flowing through the energy cells to the determined setpoint charging current.

The setpoint charging current may be determined based on at least one of the highest scanned cell voltage, the highest maximum cell voltage of one of the energy cells and a ratio of cell voltages. A ratio of cell voltages is called debalancing and may be formed in different ways, for example, based on a maximum distance from a geometric or arithmetic average value, or based on the cell voltages that are the farthest apart from each other.

The method may preferably be executed on the processing device of the energy store described and/or a further processing device in the area of the charging device described or the adapter described.

A computer program product having program code means for carrying out the method described is able to run on a processing device or able to be stored on a computer-readable data carrier.

BRIEF DESCRIPTION OF THE DRAWINGS

FIG. 3 shows a flow chart of a method for charging the energy store in FIG. 1.

DETAILED DESCRIPTION OF THE INVENTION

Figure 1:
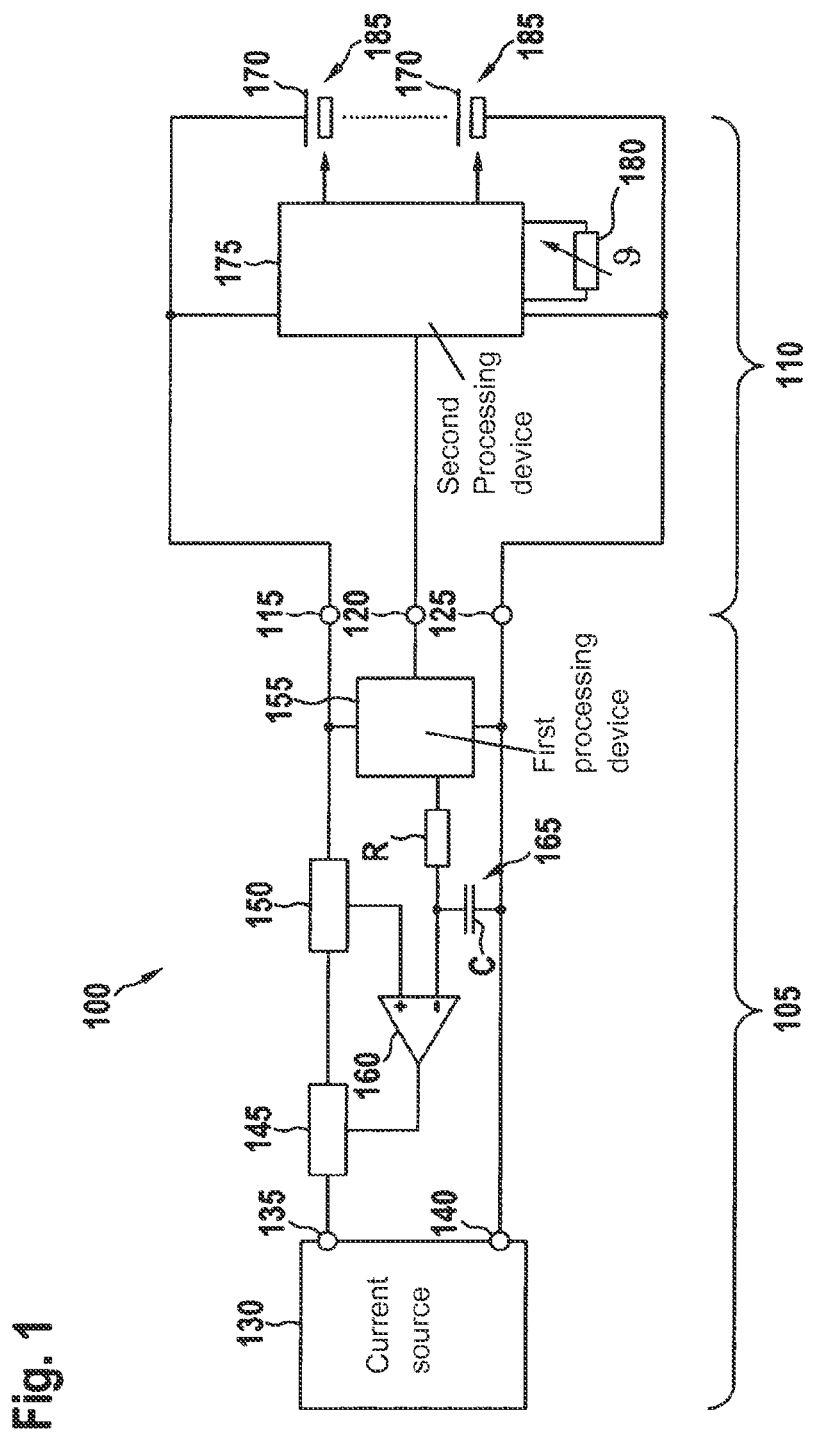
FIG. 1 shows a system made up of a charging device and an energy store.

FIG. 1 shows a system made up of a charging device 105 and an energy store 110. Charging device 105 is electrically connected to energy store 110 using a first connection 115, a second connection 120 and a third connection 125.

Charging device 105 includes a current source 130 having a first terminal 135 and a second terminal 140. Furthermore, charging device 105 includes a limiting device 145, a current sensor 150, a first processing device 155, a resistor R, a capacitor C and a comparator 160.

A charging current provided by current source 130 flows from first terminal 135 to limiting device 145, from there to current sensor 150 and on to first connection 115. After the charging current has flowed within energy store 110 from first connection 115 to third connection 125, it flows on to the second terminal of current source 130, so that the circuit is closed. Limiting device 145 is controlled by an output signal of comparator 160. Comparator 160 has a positive (noninverting) and a negative (inverting) input. The positive input is connected to current sensor 150, the negative input to a low-pass filter 165, which includes resistor R and capacitor C. An input signal of low-pass filter 165 is provided by first processing device 155.

For this, first processing device 155 is equipped to generate the input signal of low-pass filter 165 based on data received via second connection 120. First processing device 155 is preferably implemented as a digital microcomputer. The signal provided by first processing device 155 is a square-wave signal, preferably a pulse width-modulated square-wave signal (pulse-width modulation, PWM). Consequently, at the negative input of comparator 160 a voltage is present which is a function of the square-wave signal and, in particular, of a pulse control factor of the pulse-width modulated square-wave signal of first processing device 155. In one alternative specific embodiment, the first processing device is also able to provide the input signal of comparator 160 in another way, using low-pass filter 165, for instance, using a digital/analog converter. Comparator 160 is also able to compare digital values, first processing device 155 and current sensor 150 both providing digital values.

Comparator 160 compares the signal provided by current sensor 150 to the signal provided by low-pass filter 165. If the signal provided by current sensor 150, which corresponds to the charging current actually flowing through the energy store, exceeds the signal provided by low-pass filter 165, the output signal of comparator 160 effects a further limitation of the charging current using limiting device 145, until the charging current has dropped so far that the signal provided by current sensor 150 is maximally as big as the signal provided by first processing device 155 and low-pass filter 165. Consequently, based on the signal provided by the first processing device, the charging current flowing through energy store 110, is able to be limited.

Energy store 110 includes a series of energy cells 170 and a second processing device 175. Energy cells 170 are connected in series to one another and are connected between first terminal 115 and third terminal 125. Second processing device 175 is connected to energy cells 170, in order to scan individual cell voltages of energy cells 170. Energy store 110 optionally includes a temperature sensor 180 for scanning a temperature of energy store 110 and/or a series of cell-related temperature sensors 185 for scanning individual temperatures of energy cells 170. Second processing device 175 is preferably also a digital microcomputer, which is connected to first terminal 115 and third terminal 125 for the supply with an operating voltage.

Second processing device 175 is equipped, based on the scanned cell voltages of energy cells 170, to determine a setpoint charging current which ensures that one energy cell 170 is not overcharged with a high cell voltage, while another energy cell 170 keeps on being charged using a lower cell voltage. In further specific embodiments, one may include in the determination the temperature of energy store 110 scanned by temperature sensor 180 and/or the temperatures of individual energy cells 170 scanned using cell-related temperature sensors 185.

Transmission of information between second processing device 175 and first processing device 155 preferably is performed digitally, using an appropriate protocol. In one alternative specific embodiment, however, an analog signal may also be transmitted. The determination of the setpoint charging current may also take place based on cell voltages and perhaps the temperature and/or the individual temperatures of energy cells 170, in first processing device 155 instead of in second processing device 175. In this case, essentially scanned values are transmitted from second processing device 175 to first processing device 155.

Figure 2:
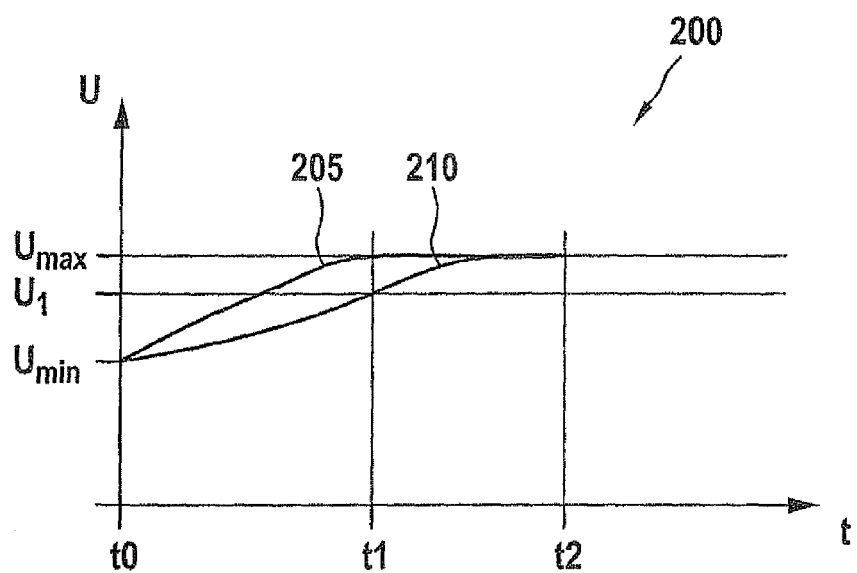
FIG. 2 shows a diagram showing charging curves of two energy cells.

FIG. 2 shows a diagram 200 having charging curves of two energy cells 170 of energy store 110 from FIG. 1. Diagram 200 includes a first charging curve 205 of a first energy cell 170 and a second charging curve of a second energy cell 170. Time is shown in the horizontal direction and cell voltage is entered in the vertical direction.

Without restricting generality, one may assume that, at a point t0, at which a charging process of energy store 110 is begun at charging device 105, the cell voltages at the two observed energy cells 170 have the same value $U_{min}$. After time t0, the two energy cells 170 have an at first constant charging current flowing through them. First charging curve 205, however, rises faster than second charging curve 210, because the two energy cells 170 are charged at different speeds, on account of manufacturing tolerances, aging effects and other variances.

At time t1, first charging curve 205 reaches a predetermined maximum cell voltage $U_{max}$. At this point in time, second charging curve 210 has a cell voltage $U_1$ which is less than $U_{max}$. In this context, it is assumed that maximum cell voltage $U_{max}$ for the two charging curves 205, 210 is identical. Usually, when first energy cell 170 of energy store 110 has reached assigned maximum cell voltage $U_{max}$, that is, at time t1 in FIG. 2, the charging current is switched off and the charging process of energy store 110 is finished. The difference between charging curves 205, 210 at time t1, in this instance, points to a debalancing of energy cells 170 of energy store 110, since energy cell associated with second charging curve 210 has an even lesser cell voltage than maximum cell voltage $U_{max}$.

According to the present invention, for each cell 170 of energy store 110, a difference is determined between the respective cell voltage and the respective cell voltage $U_{max}$. In this context, an individual maximum cell voltage $U_{max}$ may be assigned to each energy cell 170. If one of the differences falls below a predetermined quantity, the time at which one of energy cells 170 is fully charged lies shortly ahead. As a function of the ratio of the differences described, corresponding to the debalancing of energy cells 170 of energy store 110, it is now achieved that the charging current flowing through energy store 110 is limited.

In a conventional charging process of energy store 110, charging first takes place using a constant charging current, until a predetermined voltage is present at energy store 110. The charging current is subsequently lowered, usually essentially asymptotically towards zero ("current tail"). As a safety function, if the charging current is switched off already when one of the cell voltages of energy cells 170 exceeds a predetermined value, the charging process is ended before the current tail is reached, and energy store 110 is not charged optimally.

If, on the other hand, according to the present invention, the charging current is reduced before the cell voltage of one of energy cells 170 reaches the maximum admissible voltage assigned to it, the measured cell voltage also drops off, since the internal resistance of energy cell 170 leads to an additional voltage drop. While the charging process is continued at a lower charging current, the cell voltages of energy cells 170 of energy store 110 are able to adapt to one another, because at a first energy cell 170 having a higher cell voltage, the cell voltage does not increase as greatly as at a second energy cell 170 having a lower cell voltage. Because of the cell voltage adaptation of energy cells 170 ("balancing"), improved charging of energy store 110 is able to be achieved.

FIG. 3 shows a flow chart of a method for charging energy store 110 of FIG. 1.

In a first step 305, individual cell voltages of energy cells 170 are scanned. Next, in a step 310, a maximum cell voltage is determined for each of energy cells 170. In one specific embodiment, the individual maximum cell voltages are stored in a memory of second processing device 175. In a step 315, voltage differences are next determined between the cell voltages and the respective maximum cell voltages. In a subsequent step 320, based on the voltage differences, differences or ratios are formed. These differences or ratios form the basis for a debalancing of energy cells 170 of energy store 110, determined in a step 325.

The following steps 330 and 335 are optional. In step 330, a temperature of energy store 110 is scanned, using temperature sensor 180. In step 335, individual cell temperatures of energy cells 170 of energy store 110 are scanned.

Next, in a step 340, a setpoint charging current is determined, based on the debalancing determined in step 325, and possibly the temperatures scanned in steps 330, 335. The setpoint charging current, in this context, is dimensioned so that an energy cell 170, whose cell voltage is close to the assigned maximum cell voltage, is not overcharged, while another energy cell, whose cell voltage is still below the assigned maximum voltage, continues to be charged if the charging current, flowing through energy cells 170, assumes a value below the determined setpoint charging current.

In a step 345, the setpoint charging current is transmitted by second processing device 175 to first processing device 155, using second terminal 120. Subsequently, in step 350, a first signal is generated for the charging current using current sensor 150, while preferably at the same time, in a step 355, a second signal is generated for the setpoint charging current transmitted in step 345 using first processing device 155 and low-pass filter 165.

In a final step 360, the two signals generated are compared to each other and, based on the comparison, limiter 145 is actuated so that the charging current assumes a value which is at a maximum as great as that of the charging current. The method then returns to step 305, and may run through again.

It is obvious that some of steps 305 to 360 may also be carried out in a different sequence. In particular, some of steps 305 to 360 may also be carried out side-by-side to one another. Other specific embodiments, especially ones described above with reference to FIG. 1, require a corresponding adaptation of method 300, that is obvious to one skilled in the art.

What is claimed is:

1. An electrically chargeable energy store, comprising:
   a plurality of energy cells connected in series;
   a scanning device configured to scan cell voltages of the energy cells; and
   a processing device configured to determine a setpoint charging current of the energy cells based on differences between the scanned cell voltages.

2. The energy store as recited in claim 1, wherein the processing device determines the setpoint charging current in at least three steps.

3. The energy store as recited in claim 1, wherein the processing device determines the setpoint charging current in a single integrated step.

4. The energy store as recited in claim 1, wherein the processing device determines the setpoint charging current additionally based on maximum cell voltages assigned to the energy cells.

5. The energy store as recited in claim 1, further comprising:
   a second scanning device configured to scan a temperature of the energy store;
   wherein the processing device determines the setpoint charging current additionally based on the scanned temperature.

6. The energy store as recited in 1, further comprising:
   a second scanning device configured to scan cell temperatures of the energy cells;
   wherein the processing device determines the charging current additionally based on the scanned cell temperatures.

7. The electrically chargeable energy store of claim 1, further comprising:
   a first device configured to provide a first signal as a function of a charging current provided to the energy store;
   a second device configured to provide a second signal as a function of the setpoint charging current; and
   a comparator device configured to control the charging current as a function of the first and second signals.

8. The electrically chargeable energy store of claim 7, wherein the first and second signals are represented by voltages, and wherein the second device includes a square-wave generator and a post-connected low-pass filter.

9. A charging device for providing a charging current for an energy store having a plurality of energy cells, a scanning device configured to scan cell voltages of the energy cells, and a processing device configured to determine a setpoint charging current of the energy cells based on differences between the scanned cell voltages, comprising:

a limiting device configured to limit a charging current provided to the energy store to the setpoint charging current determined by the processing device.

10. The charging device as recited in claim 9, further comprising:

a first device configured to provide a first signal as a function of the charging current;

a second device configured to provide a second signal as a function of the setpoint charging current; and a comparator device configured to control the charging current as a function of the first and second signals.

11. The charging device as recited in claim 10, wherein the first and second signals are represented by voltages, and wherein the second device includes a square-wave generator and a post-connected low-pass filter.

12. A method for charging an electrically chargeable energy store having a plurality of energy cells connected in series, comprising:

scanning cell voltages of the energy cells;

determining a setpoint charging current of the energy cells based on differences between the scanned cell voltages; and limiting a charging current flowing through the energy cells to the determined setpoint charging current.

13. The method as recited in claim 12, wherein the setpoint charging current is determined based on at least one of the highest scanned cell voltage, the highest maximum cell voltage of one of the energy cells and a ratio of cell voltages.

14. The method of claim 12, further comprising:

providing a first signal as a function of the charging current;

providing a second signal as a function of the setpoint charging current; and controlling the charging current as a function of the first and second signals.

15. The method of claim 14, wherein the first and second signals are represented by voltages.

16. A non-transitory computer-readable data store medium storing a computer program having program code which, when executed on a computer, performs a method for charging an electrically chargeable energy store having a plurality of energy cells connected in series, the method comprising:

scanning cell voltages of the energy cells;

determining a setpoint charging current of the energy cells based on differences of the scanned cell voltages; and limiting a charging current flowing through the energy cells to the determined setpoint charging current.

17. The non-transitory computer-readable data storage medium of claim 16, wherein the method further comprises:

providing a first signal as a function of the charging current;

providing a second signal as a function of the setpoint charging current; and controlling the charging current as a function of the first and second signals.

18. The method of claim 17, wherein the first and second signals are represented by voltages.

* * * * *